United States Patent
Davis et al.

(10) Patent No.: US 6,643,815 B1
(45) Date of Patent: Nov. 4, 2003

(54) DATA COMPRESSION OVER COMMUNICATIONS LINKS WHICH ARE EXPOSED TO OCCASIONAL ERRORS

(75) Inventors: Gordon Taylor Davis, Chapel Hill, NC (US); Malcolm Scott Ware, Raleigh, NC (US); Charles Robert Young, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/538,204

(22) Filed: Mar. 30, 2000

(51) Int. Cl.⁷ ................................................. G06F 11/00
(52) U.S. Cl. ..................... 714/758; 714/798; 370/503
(58) Field of Search .............................. 714/758, 752, 714/798; 370/503

(56) References Cited

U.S. PATENT DOCUMENTS

| | | | |
|---|---|---|---|
| 3,631,455 A | 12/1971 | Gregg | 340/324 A |
| 3,750,147 A | 7/1973 | Gregg | 340/347 DD |
| 4,729,123 A | 3/1988 | Wheen | 370/100 |
| 4,814,746 A | 3/1989 | Miller et al. | 341/95 |
| 4,937,844 A * | 6/1990 | Kao | 375/240 |
| 5,130,993 A | 7/1992 | Gutman et al. | 371/42 |
| 5,323,155 A | 6/1994 | Iyer et al. | 341/51 |
| 5,384,780 A | 1/1995 | Lomp et al. | 370/94.1 |
| 5,424,732 A | 6/1995 | Iyer et al. | 341/51 |
| 5,675,591 A | 10/1997 | Salzwedel et al. | 371/53 |
| 5,751,741 A * | 5/1998 | Voith et al. | 714/758 |
| 5,831,558 A | 11/1998 | Harvell | 341/106 |
| 5,867,510 A * | 2/1999 | Steele | 714/758 |
| 5,955,976 A | 9/1999 | Heath | 341/87 |
| 5,973,630 A | 10/1999 | Heath | 341/87 |
| 6,141,788 A * | 10/2000 | Rosenberg et al. | 714/774 |
| 6,292,919 B1 * | 9/2001 | Fries et al. | 714/758 |

\* cited by examiner

Primary Examiner—Albert Decady
Assistant Examiner—Esaw Abraham
(74) Attorney, Agent, or Firm—Whitham, Curtis & Christofferson, P.C.; Scott W. Reid

(57) ABSTRACT

Re-synchronization of sets of transmit and receive state variables in a communication system is achieved when an error is detected, without disrupting the connection. Each of first and second transceivers, connected by a communications channel, have a common set of transmit and receive state variables supporting a data encoding algorithm function. The transmitter of one of the first and second transceivers fist encodes data to be transmitted and updates the transmit state variables according to the data encoding algorithm and the receiver of the receiving transceiver validates whether or not each data block has been received correctly. During the process of decoding the data, the receive state variables are updated according to the same algorithm used to update the transmit state variables, thereby keeping the two sets of state variables in synchronism with each other. When an error is detected, re-synchronization occurs by switching to transparent mode in the direction of communication in which the error occurred and resetting the corresponding transmit and receive sets of state variables.

23 Claims, 4 Drawing Sheets

DATA COMPRESSION OVER COMMUNICATIONS LINKS WHICH ARE EXPOSED TO OCCASIONAL ERRORS

CROSS-REFERENCE TO RELATED APPLICATION

The subject matter of this application is related to the disclosure of U.S. patent application Ser. No. 09/539,105 filed concurrently herewith by Gordon T. Davis, Malcolm S. Ware and Charles R. Young for "System and Method for Re-synchronization of Transmit and Receive Compression Dictionaries" and assigned to a common assignee herewith. The disclosure of application Ser. No. 09/539,105 is incorporated herein by reference.

BACKGROUND OF THE INVENTION

1. Field of the Invention

The present invention generally relates to data communications systems and, more particularly, to data communications systems which enable data compression and allow re-synchronization of transmit and receive compression dictionaries when an error is detected, without disrupting the connection.

2. Background Description

Data compression is widely used in voice-band modems today, using an international standard; i.e., International Telecommunications Union-Telecommunications Services Sector (ITU-T)(formerly Consultative Committee on International Telephone and Telegraphy (CCITT)). The V.42bis protocol specifies data compression for modems which depends on reliable delivery of data via error detection and recovery mechanisms, such as V.42. An example of a voice-band modem using data compression based on the well-known Lempel/Ziv algorithm is described in U.S. Pat. No. 4,814,746 to Victor S. Miller et al. for "Data Compression Method". In particular, the Miller et al. patent describes communications between a host computing system and a number of remote terminals. According to the Miller et al. patent, this communication is enhanced by a data compression method which modifies the data compression method of Lempel and Ziv by addition of new character and new string extensions to improve the compression ratio, and deletion of a least recently used routine to limit the encoding tables to a fixed size to significantly improve data transmission efficiency.

A system requirement in these systems is that the data processed by the receiving data compression unit must be free of errors. Otherwise, the receive dictionary in that modem will get out of sync with the transmit dictionary in the modem at the other end of the communications link. Voice band modems typically address this issue by adding an error control function (i.e., V.42, MNP 4) which detects errors and requests retransmission of data blocks received in error.

U.S. Pat. No. 5,130,993, to Michael Gutman et al. for "Transmitting Encoded Data on Unreliable Networks" describes a system in which information encoded by data compression (or another data encoding technique, e.g., encryption, requiring synchronization between the encoder and decoder) is transmitted over an unreliable network by checking for transmission errors after decoding. If an error is detected, the encoder is reset, using a reset protocol compression codeword which may operate over an unreliable reverse channel by using a timer to generate further reset requests when the receiver does not acknowledge them in a timely fashion since multiple errors may corrupt an initial attempt to send reset requests.

SUMMARY OF THE INVENTION

It is therefore an object of the present invention to provide a mechanism in a data communication system which allows re-synchronization of transmit and receive compression dictionaries when an error is detected, without disrupting the connection in the other direction.

Re-synchronization of sets of transmit and receive state variables in a communication system is achieved when an error is detected, without disrupting the connection. Each of first and second transceivers, connected by a communications channel, have a common set of transmit and receive state variables supporting a data encoding algorithm function. The transmitter of one of the first and second transceivers first encodes data to be transmitted and updates the transmit state variables according to the data encoding algorithm and generates a Cyclic Redundancy Check (CRC) checksum for each data block to be transmitted. The receiver of the receiving transceiver converts the received signal into a bit stream and processes the bit stream by a CRC checksum validating whether or not each data block has been received correctly. The data blocks are passed through the data decoding algorithm function at the receiver, which converts the data to correspond to its original form. During the process of decoding the data, the receive state variables are updated according to the same algorithm used to update the transmit state variables, thereby keeping the two sets of state variables in synchronism with each other. When an error is detected by the CRC checksum by one of the first or second transceivers, re-synchronization occurs by switching to transparent mode and resetting the corresponding transmit and receive sets of state variables in the direction of communication in which the error occurred.

According to a preferred embodiment of the invention, the data encoding algorithm is a data compression algorithm and the sets of state variables are transmit and receive compression dictionaries. The transmitter of a first transceiver first compresses the data to be transmitted, and updates the transmit compression dictionary according to standard data compression algorithms. The transmitter also generates the CRC checksum, and the data is then encoded for Forward Error Correction (FEC) and transmitted across the communications channel to the receiver of a second transceiver. Within the second transceiver, the received signal is converted into a bit stream which is processed by the FEC function which corrects most errors in the bit stream. A CRC checksum validates whether or not each data block has been received correctly. Most data blocks will be either received correctly, or be correctable to the desired data content via the FEC function. These data blocks will be passed through the data decompression algorithm which will expand the data to correspond to its original form. During the process of decompressing the data, the receive compression dictionary will be updated according to the same algorithm used to update the transmit compression dictionary, thus keeping the two dictionaries in synchronism with each other when errors are detected. In the event of an error, the Transparent Mode (TM) command is used instead of a compression codeword to achieve a more flexible system. Another object of the invention is to delay error recovery procedures until the line is error free again, thereby avoiding timeout due to additional errors corrupting the error recovery procedure.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
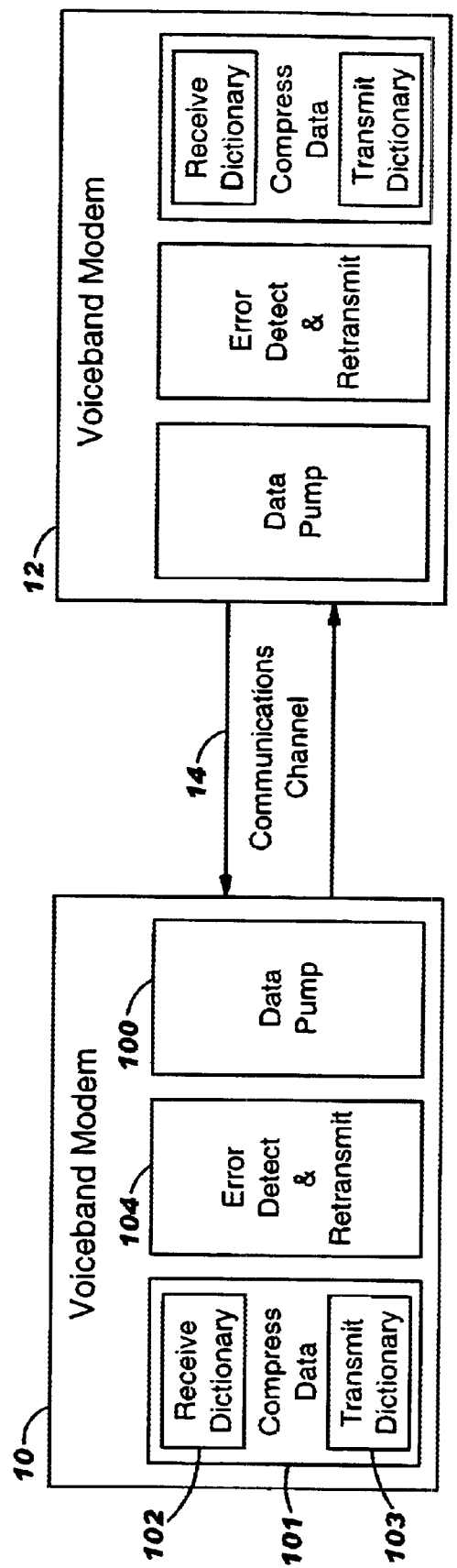
FIG. 1 is a block diagram of a voice-band modem system with data compression and error control.

Referring now to the drawings, and more particularly to FIG. 1, there is shown a voice-band modem system with data compression and error control. In FIG. 1, two voice band modems (for "modulator/demodulator") 10 and 12 are connected at either end of a communication channel 14. Taking modem 10 as typical, a data compression method 101 having a receive dictionary 102 and a transmit dictionary 103 is employed to compress and de-compress data transmitted and received by the modem. The modem also includes an error detection and re-transmit function 104 which, when an error is detected, requests re-transmission of the data. Finally, the modem includes a data pump 100 which maintains synchronization of the transmitted and received data.

Although the error control functions typically used are not foolproof, they limit errors to be infrequent enough (typically less than one during a 24 hour day) that if the connection crashed it does not create a major problem. A variation on FIG. 1 is disclosed in U.S. Pat. No. 5,130,993, to Michael Gutman et al. where the order of data compression and error detection/retransmit are reversed, requiring the compression function to deal with the possibility of corrupted data. However, the method of dealing with corrupted data described in the Gutman et al. patent is different than the methods implemented by this invention, as will be made clear in the following description.

Data compression is typically not applied in broadband communications systems. Such systems more typically use Forward Error Correction (FEC) algorithms such as Reed-Solomon coding to minimize errors to an acceptable level, but it is important to note that a small but statistically significant percentage of errors experienced in such a system are uncorrectable. Even though error-free operation is typically not achieved, Forward Error Correction is the preferred approach in high-speed systems, because it can be implemented without significant data buffering requirements, while typical error recovery with retransmission of corrupted data blocks requires significant buffering of data in transit. In fact, the higher the data rate is on the communications channel, the larger the number of data blocks in transit are and the larger the buffering requirements become. At a minimum, error recovery procedures require buffering capacity equal to the amount of data which can be transmitted in time T, where T is the round-trip delay time through the communications channel plus propagation delay times through both transmit and receive circuits in both modems.

Figure 2:
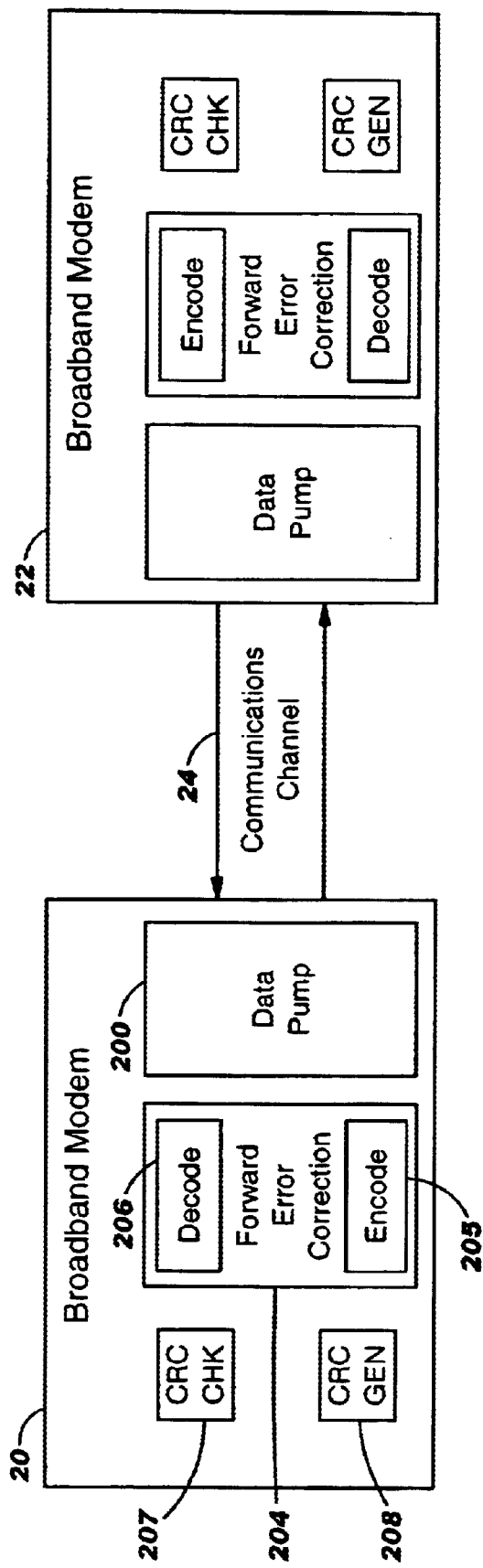
FIG. 2 is a block diagram of a broadband modem system using Forward Error Control (FEC)

A broadband modem system using Forward Error Correction is illustrated in FIG. 2. Two broadband modems 20 and 22 are connected to either end of the communications channel 24, like the voice band modems shown in FIG. 1. Taking the modem 20 as typical, the broadband modems differ from the voice band modem in the use of a Forward Error Correction (FEC) method 204 having encode and decode processes 205 and 206. In addition to the FEC method 204, the broad band modem 20 uses a Cyclic Redundancy Code (CRC) check 207 and a CRC generator 208 to detect any errors which were not correctable by the FEC process 204.

Even though such systems manage to limit errors to a reasonable level relative to the data throughput required (typically one error every 5 to 10 minutes), it would be totally unacceptable to crash the connection every time an error gets through the error correction mechanism. Thus, data compression algorithms have not been used due to their dependence on error-free data. Other broadband transmission systems may achieve similar error rates without error correction because the communications channel is less hostile to the modem signals. For the same reasons, those systems have not taken advantage of data compression capabilities.

Figure 3:
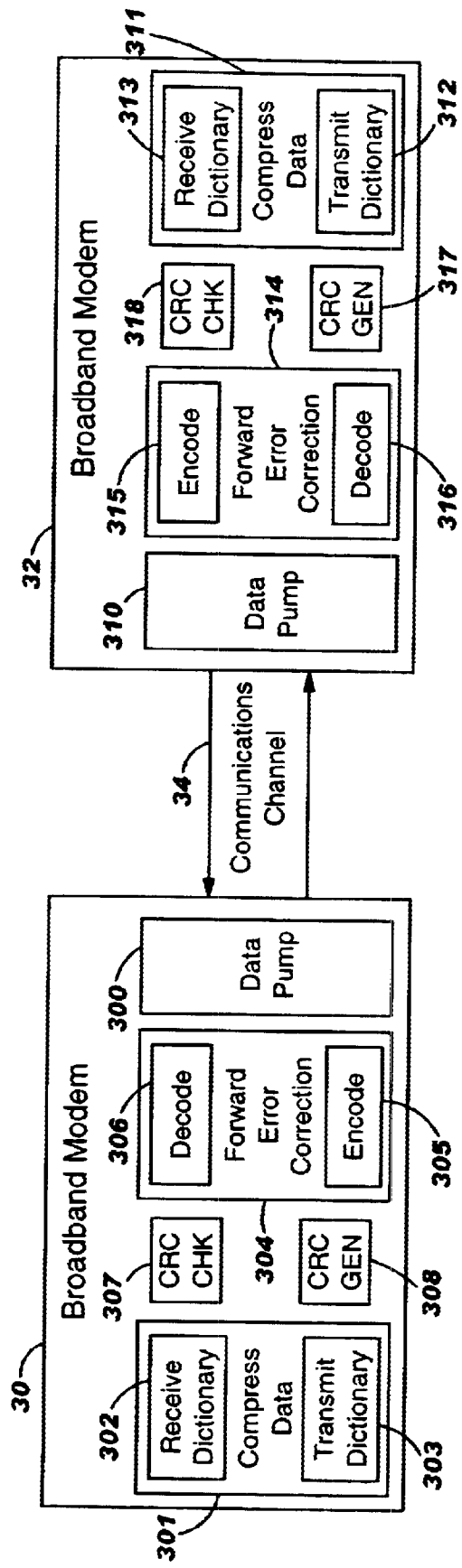
FIG. 3 is a block diagram of an enhanced broadband modem system which enables data compression according to the invention.

FIG. 3 illustrates an enhanced implementation for a broadband modem system, which enables data compression, according to the present invention. This system is similar to that shown in FIG. 2 in that two broadband modems 30 and 32 are connected to either end of the communications channel 34. Taking the modem 30 as typical, the broadband modems according to the present invention include a Forward Error Correction (FEC) method 304 having encode and decode processes 305 and 306. In addition to the FEC method 304, the broad band modem 30 uses a Cyclic Redundancy Code (CRC) check 307 and a CRC generator 308 to detect any errors which were not correctable by the FEC process 304. The broad band modems according to the present invention differ from the broadband modem 20 of FIG. 2 in the addition of a data compression method 301 having a receive dictionary 302 and a transmit dictionary 303.

The key to making this system practical is a mechanism which allows re-synchronization of receive and transmit compression dictionaries 302 and 303 when an error is detected, without disrupting the connection. Such a system would work equally well with or without error correction functions as long as the error rate remained reasonably low and specific error events can be detected (i.e., via a CRC checksum). Certainly, rates as low as one per minute would work well. At higher error rates, the overhead of re-synchronizing the compression dictionaries begins to erode the gains achieved via compression.

Referring again to FIG. 3, the transmitting modem, which for purposes of this example will be assumed to be modem 30, first compresses the data to be transmitted using data compression method 301, and updates the transmit compression dictionary 303 according to standard data compression algorithms. A CRC checksum is generated, and then the data is encoded for forward error correction and transmitted via the data pump 300 across the communications channel 34 to the other modem. Within the other modem 32, the data pump receiver 310 converts the received signal into a bit stream which is processed by the Forward Error Correction function 314 which corrects most errors in the bit stream. A CRC checksum validates whether or not each data block has been received correctly. Most data blocks will be either received correctly, or be correctable to the desired data content via Forward Error Correction. These data blocks will be passed through the data decompression algorithm which will expand the data to correspond to its original form. During the process of decompressing the data, the receive compression dictionary 312 will be updated according to the same algorithm used to update the transmit compression dictionary, thus keeping the two dictionaries in synchronism with each other.

In the case where the CRC checksum indicates that an uncorrectable error has occurred, updating of the receive compression dictionary 312 is terminated, and data is no longer passed up to the modem interface. To recover from this condition, the modem receiving the uncorrectable data must signal the other modem (where that data originated), and the two modems must then re-synchronize their dictionaries prior to restarting the flow of data This procedure must insure that both the transmit and receive compression dictionaries restart with identical content at the same point within the bit stream flowing between the two modems. A supervisory communications channel between the two data pumps may be used to pass a message from the data pump detecting a CRC error to the data pump which sent that data. Upon receiving such a message, a data pump would alter its transmit data compression function to reset its compression dictionary and to send a dictionary reset command in the normal communications channel to the modem which detected the CRC error. The actual dictionary reset command is sent through the normal in-band channel to facilitate synchronization of dictionaries at both modems relative to the start of new data flowing immediately after the reset. Co-pending patent application Ser. No. 09/539,105 entitled "System and Method for Re-synchronization of Transmit and Receive Compression Dictionaries" describes the preferred mechanism for accomplishing the required signaling and re-synchronization which avoids modification to the data pump functions by using in-band signaling controlled by the compression function.

Figure 4:
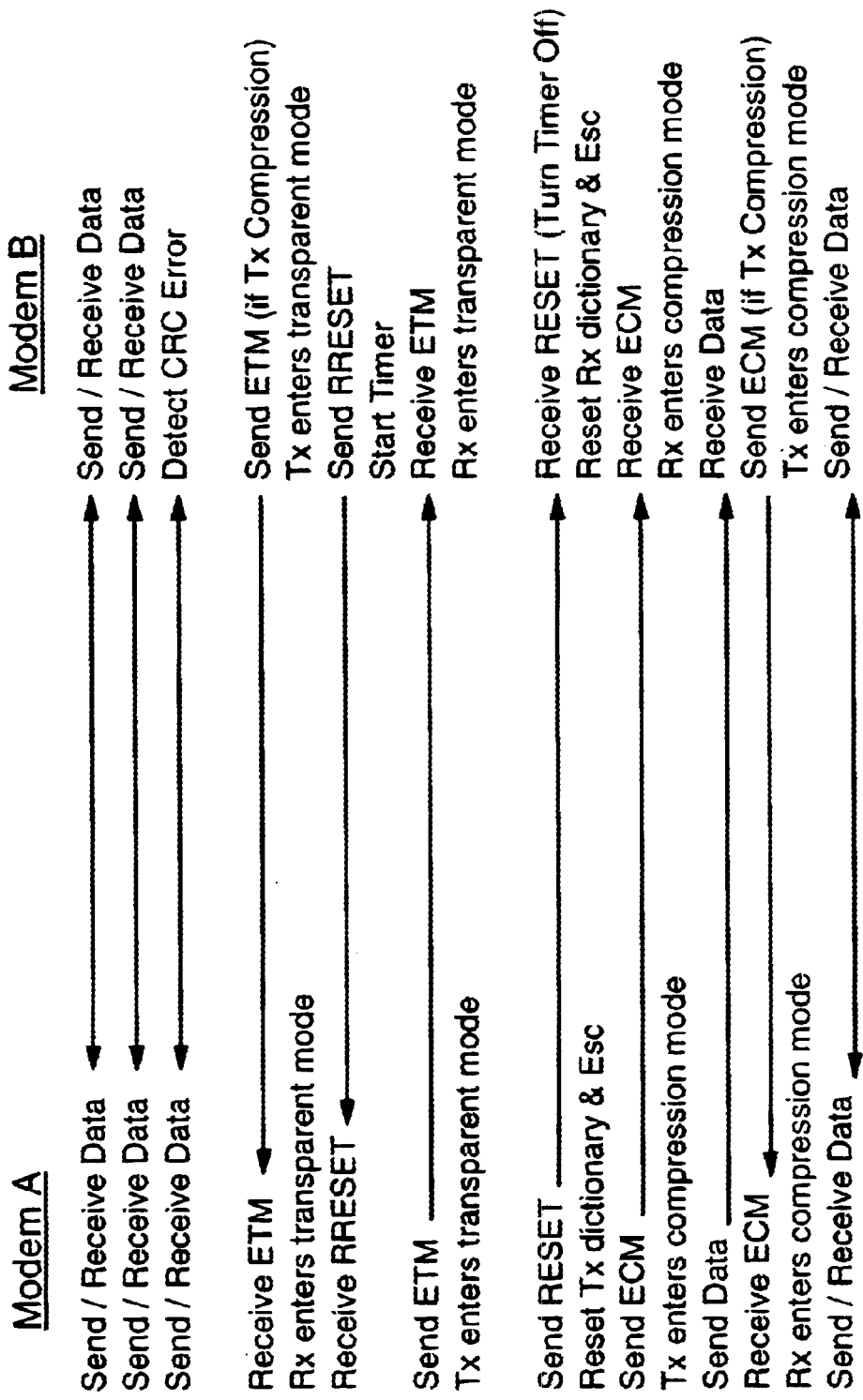
FIG. 4 is a diagram showing the procedure for resetting compression dictionaries between two modems.

FIG. 4 illustrates the process between two modems, here labeled Modem A and Modem B. To begin with, both Modems A and B send and receive compressed data normally. In this example, Modem B detects a CRC error and, as a result, sends an enter transparent mode (ETM) message to Modem A and switches its transmitter to the transparent mode. Upon receiving the ETM message, Modem A receiver enters the transparent mode. Modem B follows the ETM message with a new command, called RRESET, and starts a timer. When Modem A receives the RRESET command, it responds by sending the ETM message and switches its transmitter to transparent mode. Upon receiving the ETM message from Modem A, Modem B switches its receiver to transparent mode. After sending the ETM message, Modem A then sends a RESET command, resets its transmit dictionary and the escape character. Upon receiving the RESET command, Modem B turns off the timer and resets its receive dictionary and escape character. At this point in the procedure, the compression dictionaries have been reset in the transparent mode. While in the transparent mode, Modems A and B independently decide, based on data and dictionary content, when and if to switch back to compression mode. In the example illustrated, Modem B transmitter would likely switch to compression mode first since it maintains previous dictionary content while the dictionary for the reverse direction was purged. This completes the procedure, and the modems resume sending and receiving data in the compression mode.

The subject invention has particular application to broadband data communication systems such as Asymmetric Digital Subscriber Line (ADSL), cable modems, or high-speed wireless, but may also be applied to local area network connections, wide area network infrastructure, or even lower speed modems. It will be understood by those skilled in the art that transceivers other than modems may be used. In other words, the invention has general application to data communications and should not be construed to be limited to such communications requiring modems.

One aspect of the subject invention is that the error detection means may be used not just to detect the occurrence of an error, but also to detect the end of detected error events as evidenced by a return to valid CRC checksums. This may be useful in delaying the start of error recovery procedures until the physical layer modem connection stabilizes after an error event, thus making the error recovery procedure more reliable. Alternatively, a watchdog timer could monitor the error recovery procedures, but waiting for the timer to expire is typically much more time consuming when error recovery procedures are corrupted by additional errors. Delaying the recovery procedures until valid CRC checksums are again received should avoid these excessive time delays during error recovery most of the time. Another aspect of the subject invention is to limit all error recovery communications between the two modems to either a separate data pump supervisory communications channel or, if in-band, to a transparent mode (TM) of operation for the compression function, such that compression performance is not reduced in order to support additional compression code words for control of error recovery procedures. Yet another aspect of the subject invention is to support both duplex and simplex compression functions. This is possible for the same reason stated above (i.e., compression code words are not required during error recovery procedures). Simplex operation is useful in ADSL and cable modem systems where the primary focus is high bit-rates to the client while the back channel is used primarily for supervisory communications functions. In such systems, the maximum dictionary size supported can be doubled for a fixed amount of storage capacity by limiting the compression function to operate only in one direction.

While the preferred embodiment of the invention uses a Cyclic Redundancy Check (CRC) checksum to detect an error in transmission of data; other error detection mechanisms may also be used. Generally, such mechanisms generate a syndrome or signature based on the data block to be transmitted, and this syndrome or signature is used by an error detection mechanism at the receiver to detect an error in transmission.

An alternative would be to use an error recovery procedure which retransmits data blocks received in error (i.e., V.42). At the data rates used in ADSL modems, the processing cycles required to implement such error recovery procedures add significantly to the overall processing burden. In addition, such procedures add significantly to storage requirements since successful error recovery requires that data buffering must exceed the amount of data which can be transmitted during a time corresponding to the round-trip delay of the communications channel (including propagation delays through the modem itself). Both the extra processing cycles required and the extra memory for buffering the data will add to the cost and power dissipation of the modem, making it less competitive than a similar system which uses the present invention.

Although U.S. Pat. No. 5,130,993 to Gutman et al. describes a somewhat similar procedure for re-synchronizing transmit and receive compression dictionaries, it places the error detection function outside of the data compression function, making it impossible to ensure that the link has recovered from a disturbance prior to initiating error recovery procedures, while the subject invention can insure the physical connection is solid prior to initiating error recovery procedures since its error detection runs on the compressed data. The patent to Gutman et al.

also requires the use of compression code words in the error recovery procedure, thus reducing the number of dictionary entries available for user data and forcing the link to operate with compression in both directions. The subject invention makes use of auxiliary communication channels within the modem data pumps or a procedure described in co-pending patent application Ser. No. 09/539,105 for "System and Method for Re-synchronization of Transmit and Receive Compression Dictionaries" which makes use of Escape sequences applicable to transparent mode of the compression function. Either of these options enable both duplex and simplex compression functions, and both options provide a more reliable mechanism for completion of error recovery procedures.

The preferred embodiment of the invention focuses on a data compression/decompression process. Those skilled in the art will recognize that the concepts disclosed herein could be extended to other types of encoder/decoder pairs requiring synchronization of a common set of state variables (e.g., dictionaries), such as for example encryption/decryption.

Thus, while the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A data communication system which allows re-synchronization when an error is detected, without disrupting the connection, comprising:

first and second transceivers connected by a communications channel, each of said transceivers having a common set of transmit and receive state variables supporting encoding and decoding functions, respectively, of a data compression algorithm;

a transmitter of one of the first and second transceivers first encoding data to be transmitted and updating the transmit state variables according to said encoding function of said data compression algorithm and generating a syndrome or signature for use by an error detection mechanism for each data block to be transmitted, the transmitter then transmitting the data across the communications channel to a receiver of the other of the first and second transceivers; and the receiver of the receiving transceiver converting the received signal into a bit stream and processing the bit stream by an error detection mechanism validating whether or not each data block has been received correctly, and passing the data blocks passed through the decoding function of said data compression algorithm, which converts the data to correspond to its original form, and during the process of decoding the data, updating the receive state variables of said data compression algorithm, said data compression algorithm being the same algorithm used to update the transmit state variables, thereby keeping the two sets of state variables in synchronism with each other.

2. The data communication system recited in claim 1, wherein said first and second transceivers are broadband modems.

3. The data communication system recited in claim 1, wherein each of said first and second transceivers include means to delay start of error recovery procedures until subsequent data is received error free.

4. The data communication system recited in claim 1, wherein the syndrome or signature for use in the error detection function is a Cyclic Redundancy Check (CRC) checksum.

5. The data communication system recited in claim 4, further comprising re-synchronization means in said first and second transceivers which, when an error is detected by the CRC checksum by one of the first or second transceivers, causes the first and second transceivers to switch to transparent mode and reset the corresponding transmit and receive sets of state variables in the direction of communication in which the error occurred.

6. The data communication system recited in claim 5, wherein the occurrence of an error is communicated from the receiving transceiver to the transmitting transceiver via an independent control channel.

7. The data communication system recited in claim 5, wherein the occurrence of an error is communicated from the receiving transceiver to the transmitting transceiver via an in band transparent mode command.

8. The data communication system recited in claim 5, wherein said data encoding algorithm function is a data compression algorithm and said sets of state variables are transmit and receive compression dictionaries.

9. The data communication system recited in claim 8, wherein data compression is in one direction only, communication in the opposite direction being in the transparent mode.

10. The data communication system recited in claim 8, wherein data compression is in both directions.

11. The data communication system recited in claim 8, further comprising a Forward Error Correction (EEC) function in the transmitter of each of said first and second transceivers, a transmitter of a transceiver transmitting data first compressing data to be transmitted and then encoding the compressed data for FEC, the receiver of the transceiver receiving the transmitted data processing the bit stream by the FEC function.

12. In a data communication system, a method of re-synchronization when an error is detected, without disrupting the connection comprising the steps of:

encoding data to be transmitted by a transmitter of one of first and second transceivers using an encoding function of a data compression algorithm;

updating a set of transmit state variables according to the encoding function of said data compression algorithm;

generating a syndrome or signature for use by an error detection mechanism for each data block to be transmitted and transmitting the data across a communications channel to a receiver of the other of the first and second transceivers;

receiving the data transmitted across the communications channel by the receiver of the other of the first and second transceivers;

converting the received signal into a bit stream;

processing the bit stream by an error detection function to validate whether or not each data block has been received correctly;

passing the data blocks through a decoding function of said data compression algorithm, which converts the data to correspond to its original form; and during the process of decoding the data, updating a set of receive state variables according to a decoding function of said data compression algorithm, said data compression algorithm being the same algorithm used to update the set of transmit state variables, thereby keeping the two sets of state variables in synchronism with each other.

13. The method of re-synchronization of sets of transmit and receive state variables recited in claim 12, further comprising the step of delaying start of error recovery procedures until subsequent data is received error free.

14. The method of re-synchronization of sets of transmit and receive state variables recited in clam 12, wherein the syndrom or signature for use in the error detection function is a Cyclic Redundancy Check (CRC) checksum.

15. The method of re-synchronization of sets of transmit and receive state variables recited in claim 14, wherein when an error is detected by the CRC checksum at a receiver of one of the first or second transceivers, switching the first and second transceivers to transparent mode in the direction of communication in which the error occurred and resetting the corresponding sets of transmit and receive state variables.

16. The method of re-synchronization of sets of transmit and receive state variables recited in claim 15, wherein the occurrence of an error is communicated from the receiving transceiver to the transmitting transceiver via an independent control channel.

17. The method of re-synchronization of sets of transmit and receive state variables recited in claim 15, wherein the occurrence of an error is communicated from the receiving transceiver to the transmitting transceiver via an in band transparent mode command.

18. The method of re-synchronization of sets of transmit and receive state variables recited in claim 15, further comprising the step of suppressing the step of passing the data blocks passed through the data decoding algorithm function of the corresponding first or second transceivers when an error is detected by the CRC checksum at one of the first or second transceivers until the corresponding sets of transmit and receive state variables are reset.

19. The method or re-synchronization of the sets of transmit and receive state variables recited in claim 12, wherein said data encoding algorithm function is a data compression algorithm function, the data decoding algorithm function is a data decompression algorithm function and the sets of state variables are respectively transmit and receive compression dictionaries.

20. The method of re-synchronization of the sets of transmit and receive state variables recited in claim 19, further comprising the step of determining when the transmit and receive compression dictionaries are in sync and converting to compression mode from transparent mode.

21. The method of re-synchronization of the sets of transmit and receive state variables recited in claim 19, wherein data compression is in one direction only, communication in the opposite direction being in the transparent mode.

22. The method of re-synchronization of the sets of transmit and receive state variables recited in claim 19, wherein data compression is in both directions.

23. The method of re-synchronization of sets of transmit and receive state variables recited in claim 12, further comprising the steps of:

encoding compressed data to be transmitted with a Forward Error Correction (FEC) function; and processing the received converted bit stream by the FEC function.

* * * * *